Sept. 7, 1954
R. G. FERRIS
2,688,309
MILKING PARLOR STALL
Filed Aug. 29, 1951
2 Sheets-Sheet 1
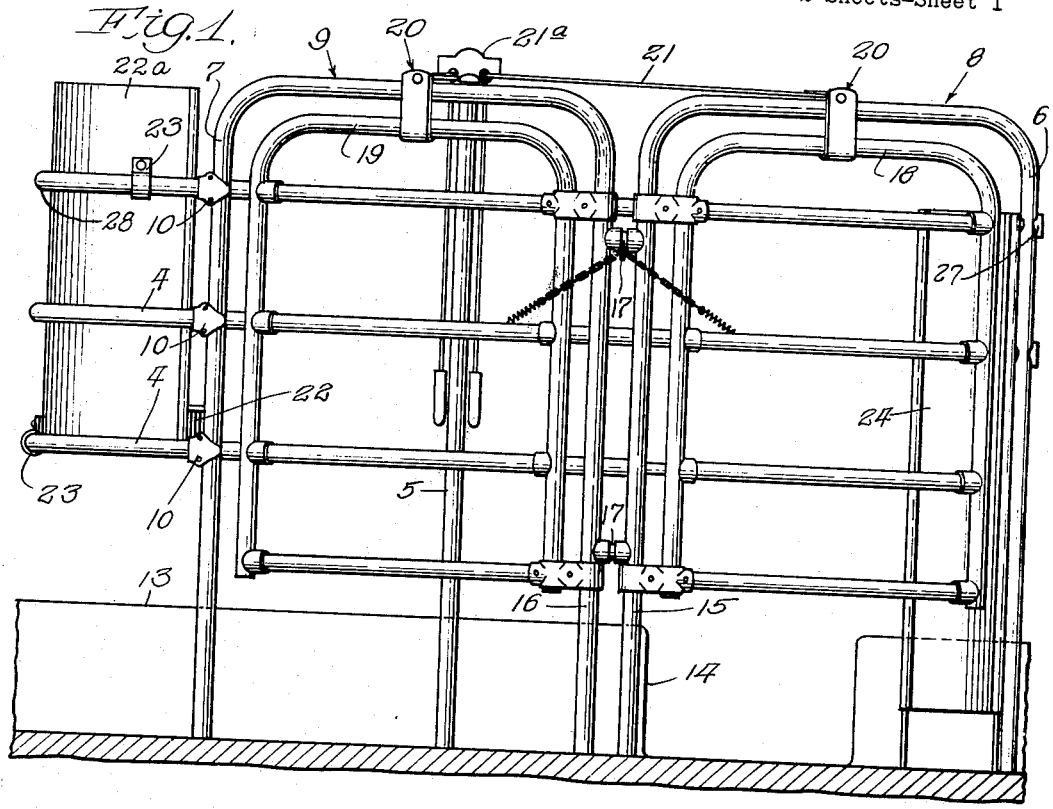
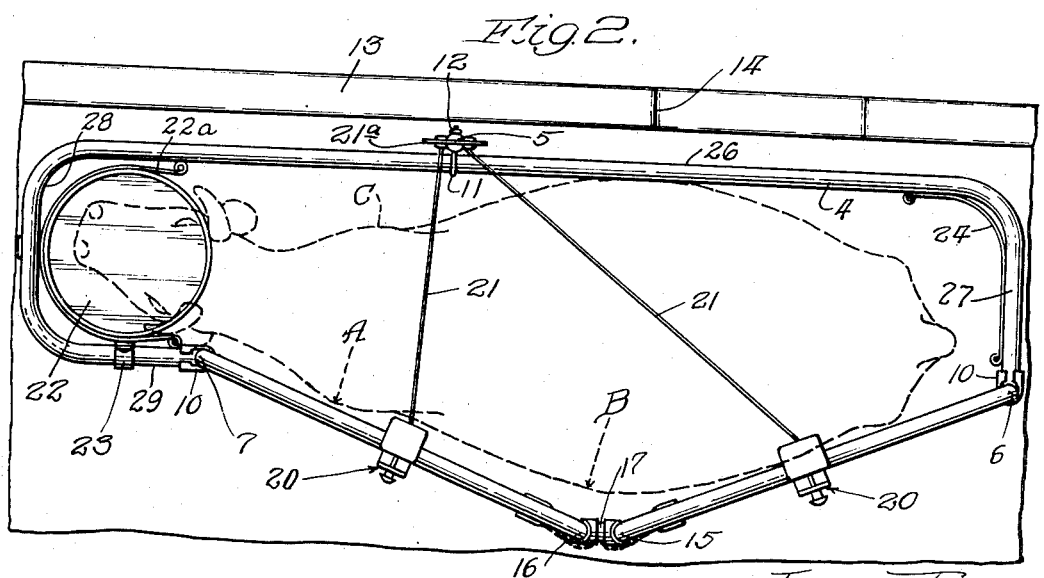
Inventor:
Robert G. Ferris,
By Schroeder, Merriam,
Hofgren & Brady, Attys.

Sept. 7, 1954  R. G. FERRIS  2,688,309
MILKING PARLOR STALL
Filed Aug. 29, 1951  2 Sheets-Sheet 2
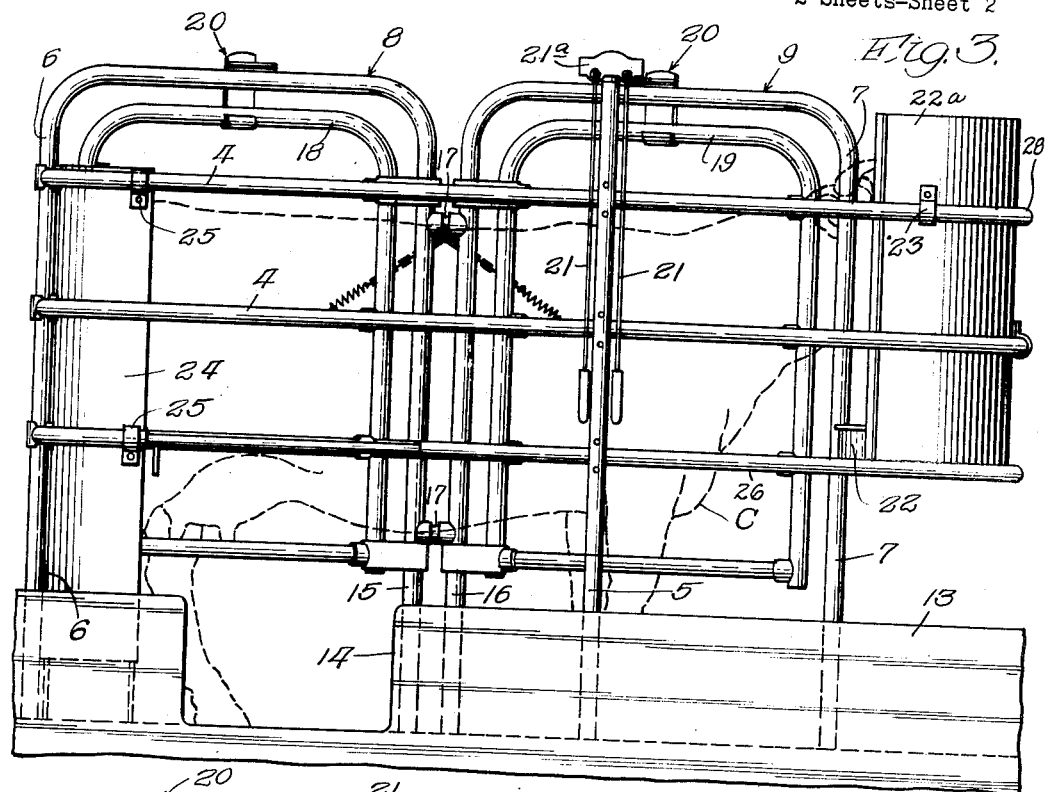
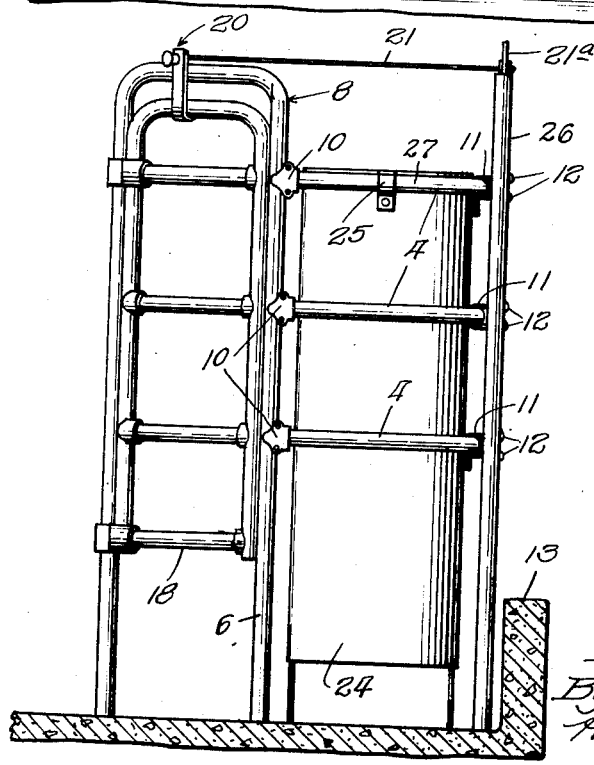
Inventor:
Robert G. Ferris,
By Schroeder, Merriam,
Hofgren & Brady, Attys.

Patented Sept. 7, 1954

2,688,309

UNITED STATES PATENT OFFICE 2,688,309

MILKING PARLOR STALL

Robert G. Ferris, Harvard, Ill., assignor to Starline, Inc., a corporation of Illinois Application August 29, 1951, Serial No. 244,143

5 Claims. (Cl. 119—27)

This invention relates to an improved milking parlor stall of the type in which a cow to be milked enters the stall from an alley through one gate and returns to the same alley through another gate, the stall including a feeding device.

Parlor stalls are used almost entirely for machine milking of cattle, and as a rule the milking machine is fastened to a portion of the stall frame. Thus, it is desirable that the cow be as closely confined as possible by the stall, so that she cannot move enough to interfere with operation of the milking machine.

Insofar as applicant is aware it has heretofore been the practice to form a parlor stall of rails to provide a fence-like enclosure. There is a front, side panel which is straight, and only slightly longer than a long cow, and a pair of end panels each of which is only wide enough to accommodate the forequarters and hindquarters of a cow. The back, or rear of the stall extends between the end panels and includes a pair of gate arches which extend diagonally toward each other from the two end panels and terminate a substantial distance apart, and a back panel which connects the two gate arches to complete the perimeter of the stall. An outwardly swinging gate is hung in each gate arch. The stall is wider at the center than at the extremities.

If a cow's forequarters and hindquarters are to be reasonably well confined the center of the stall must be wider than the extremities, because of the fact that a cow is very much wider right behind the ribs, at the portion known as the barrel, than she is in the forequarters and hindquarters. The width of a stall at the center, between the gates, is ordinarily only great enough to accommodate the barrel of a large cow. Such a parlor stall is shown in H. J. Ferris Design Patent No. 90,482 issued August 15, 1933.

The cow is brought in through one gate, which is an entrance gate, and out by the other, or exit gate, both of these gates swinging outwardly on the back panel of the stall. A feed trough occupies the end of the stall adjacent the exit gate, and thus must occupy only the rear corner and be enclosed only on two sides so as not to block the gateway. This causes a good deal of feed to be spilled by the cow.

In spite of the fact that such a stall is dimensioned to permit a cow little freedom of movement, it has been known for some time that the cow in such a stall does in fact move about enough to delay milking and cause milker trouble. The reason has not been at all clear, because all the dimensions of the stall are apparently the minimum.

I have discovered that if the short, centrally located back panel is eliminated, so that the diagonally arranged gates are hinged on very closely spaced posts in a flat V arrangement, and the same amount of space is put into the stall beyond the exit gate to accommodate the feed trough, the cow is much more closely confined in a stall which is exactly the same length and width as the former stalls. Likewise, the feed trough may be enclosed on three sides, thus reducing the spilling of feed. Consequently, both milking and feeding are more efficiently handled in my improved parlor stall, thus effecting an overall time saving in the milking process.

This result is accomplished because the diagonally positioned exit gate is relatively farther back with respect to the body of a cow standing in the stall, so that the outline of the forward half of the stall conforms more closely to the shape of the cow and her shoulders are more closely confined. To move out of the stall she must pull her neck in and turn her head out of the feed box.

The invention is illustrated in a preferred embodiment in the accompanying drawings, in which:

Fig. 1 is a rear elevation of the improved stall;

Fig. 2 is a plan view thereof, with a cow indicated in broken lines;

Fig. 3 is a front elevation; and

Fig. 4 is an end elevation, from the right of Fig. 1.

Referring to the drawings in greater detail, the stall is formed from a set of three vertically spaced, parallel, horizontal rails 4 which are supported on a post 5 and on the outer upright supporting posts 6 and 7 of a pair of arches 8 and 9, to which each rail 4 has its ends secured by clamps 10 which has post embracing jaws. Attachment to the supporting post 5 is by means of U-bolts 11 which surround the rails 4 and extend through apertures in the post 5 to receive nuts 12. A wall 13 at the front of the stall has an opening 14 for convenience in handling a milking machine; and the post 5 may be placed in any convenient location with respect to the opening 12. As best seen in Figs. 2 and 3 the rails 4 and supporting posts 5, 6 and 7 form fence means which provide a front 26, ends 27 and 28, and a portion 29 of the rear of the stall. The gate arches 8 and 9 are disposed in a flat V arrangement with their adjacent supporting posts 15 and 16 very closely spaced and secured together by means of clamps 17. A pair of gates 18 and 19 are hung respectively, on the adjacent posts 15 and 16 of the gate arches 8 and 9. Each of the gates 18 and 19 is provided with a latch mechanism indicated generally at 20, which may be manipulated from the front of the stall by means of pull chains 21 which extend through eyes in a chain plate 21a on the top of the post 5 and have their free ends hanging to give easy control of both gates from a single position. The way the gates are hung, and the gate latch mechanism are described in detail and claimed in my co-pending application Ser. No. 246,285 filed September 12, 1951 which has issued as Patent No. 2,668,381 dated February 9, 1954.

The gate 18 is the entrance gate for the stall, while 19 is the exit gate; and in the extremity of the stall which adjoins the exit gate 19 a feed trough 22 is fastened by means of metal straps 23 which encircle the pipes forming the rails 4. As best seen in Figs. 1 and 2, the feed trough 22 is circular and includes an upstanding generally semicircular shield portion 22a which surrounds three sides of the feed trough. A sheet metal shield 24 is provided at the rear of the stall, and is fastened in upright position by means of straps 25 which encircle the rails 4.

For convenience in fabrication, the rails 4, post 5, arches 8 and 9, and gates 18 and 19 are all fabricated from a single size pipe.

As is plain from Fig. 2, the stall fits a cow C, indicated in broken lines, quite closely so that she has little space in which to move about. The barrel of the cow, indicated by the letter B, is at the apex of the V formed by the gate arches, and the diagonally disposed gates 18 and 19 extend close to the cow's body so as to restrict the cow's movements as much as possible. In order for a cow to pass through the exit gate 19 she must shorten her neck and turn her head sideways. The length of the stall is just sufficient to accommodate a large cow.

The foregoing detailed description is given for clearness of understanding only and no unnecessary limitations are to be understood therefrom, as some modifications will be obvious to those skilled in the art.

I claim:

1. A stall for milking cattle comprising: continuous fence means providing the front, the ends, and one end portion of the back of the stall, said fence means forming a generally rectangular figure with all of its back open except said one end portion, a pair of gate arches to complete the perimeter of the stall, said gate arches being disposed in a flat V arrangement with no substantial space between them, and a gate in each of said gate arches, said stall being not substantially longer than a large cow, not substantially wider at its extremities than the forequarters and hindquarters of such a cow, and not substantially wider at the apex of the V than the barrel of such a cow.

2. The stall of claim 1 in which the adjacent portions of the gate arches comprise separate upright posts.

3. The stall of claim 1 in which the continuous fence means comprises a set of vertically spaced, parallel, horizontal rails, and a plurality of supporting posts.

4. A stall for milking and feeding cattle, comprising: continuous tubular metal fence means providing the front, the ends and one end portion of the back of the stall, said fence means forming a generally rectangular figure with all of its back open except said one end portion; a pair of gate arches to complete the perimeter of the stall, said gate arches being disposed in a flat V arrangement with no substantial space between them, the outer upright portions of said arches serving as supporting means for the ends of said fence means; intermediate support means secured to said fence means at the front of the stall; a gate in each of said arches which is hinged for outward swinging movement on the inner upright portion of the arch, said stall being not substantially wider at its extremities than the forequarters and hindquarters of a large cow, and not substantially wider at the apex of the V than the barrel of such a cow; a feed trough detachably secured to the fence means in said one end portion of the stall; and an upright, generally U-shaped metal shield surrounding three sides of said trough and extending upwardly therefrom above a cow's head, the distance across the open side of said shield being small enough to substantially prevent sidewise movement of the cow's head during feeding, and the length of said stall being such that a cow must bend her neck to withdraw her head from the feed box.

5. A stall for milking and feeding cattle, comprising: continuous tubular metal fence means providing the front, the ends and one end portion of the back of the stall, said fence means consisting of a plurality of horizontally disposed spaced parallel rails, and said fence means forming a generally rectangular figure with all of its back open except said one end portion; a pair of gate arches to complete the perimeter of the stall, said gate arches being disposed in a flat V arrangement with no substantial space between them, the outer upright portions of said arches serving as supporting means for the ends of said horizontal rails; a single intermediate support member secured to said rails at the front of the stall; a gate in each of said arches which is hinged for outward swinging movement on the inner upright portion of the arch, said stall being not substantially wider at its extremities than the forequarters and hindquarters of a large cow, and not substantially wider at the apex of the V than the barrel of such a cow; a feed trough detachably secured to the fence means in said one end portion of the stall; and an upright, generally U-shaped metal shield surrounding three sides of said trough and extending upwardly therefrom above a cow's head, the distance across the open side of said shield being small enough to substantially prevent sidewise movement of the cow's head during feeding, and the length of said stall being such that a cow must bend her neck to withdraw her head from the feed box.

References Cited in the file of this patent

UNITED STATES PATENTS

| Number | Name | Date |
| --- | --- | --- |
| 425,790 | Herman | Apr. 15, 1890 |
| 502,829 | Phillips | Aug. 8, 1893 |
| 1,934,177 | Ferris | Nov. 7, 1933 |
| 2,477,035 | Babson et al. | July 26, 1949 |
| 2,587,846 | Hodsdon | Mar. 4, 1952 |

OTHER REFERENCES

McCormick Parlor Stalls, pages 19, 26 and 27, printed Aug. 15, 1949.

Starline, Inc., Harvard, Ill., Catalog No. 114, copyright 1951, page 48.

Starline, Inc., Harvard, Ill., Catalog No. 118, copyright 1950, pages 18 and 19.